United States Patent Office 2,898,268
Patented Aug. 4, 1959

2,898,268

ACID PURIFICATION OF FUMAGILLIN

Harrison A. Nelson, Kalamazoo Township, Kalamazoo County, and Charles M. Large, Kalamazoo, Mich., assignors to The Upjohn Company, Kalamazoo, Mich., a corporation of Michigan No Drawing. Application March 16, 1953
Serial No. 342,714

9 Claims. (Cl. 167—65)

This invention relates to fermentation and is particularly directed to processes for the recovery of fumagillin from beer fermented with fumagillin ferment in which processes the fumagillin is precipitated by acidifying the fermented beer to pH 1 to 4 whereby a crude product, from which refined fumagillin can easily be obtained, is readily separated from the fermented beer.

Fumagillin is an antibiotic obtained by the action of fumagillin ferment, *Aspergillus fumigatus* H-3 (NRRL 2319), on a dextrin-corn steep medium, or like nutrient medium, and has been found to have utility in the treatment of various pathological conditions, particularly of infections with *Endamoeba histolytica* (Hanson and Eble, J. Bacteriology 58, 528 (1949); McCowen et al., Science 113, 202 (1951). It is a white crystalline solid having an empirical formula, $C_{27}H_{36}O_7$, a melting point of 190–191 degrees centigrade, an optical rotation, $[\alpha]_D^{25}$, of minus 26.6 degrees, a molecular weight of about 475–490, and a specific extinction coefficient ($k$) of 145–148 at 351 mu. It forms a methyl ester melting at 145–147 degrees centigrade, an octabromide melting at 118–122 degrees centigrade, and a 2,4-dinitrophenyl hydrazone melting at 123–126 degrees centigrade.

In the recovery of antibiotics from fermented beers, it is customary to extract the neutral fermented beer with a water-immiscible solvent such as chloroform. When such a process is applied to the recovery of fumagillin from a fumagillin-containing fermented beer, the product recovered from the extract is contaminated with foreign materials also extracted from the fermented beer. The presence of these other materials, notwithstanding the high solvent efficiency of the chloroform for the fumagillin, so complicates the further processing of the fumagillin extract that the process is involved and the overall yield is low.

We have now found that fumagillin, unlike other antibiotics, can be precipitated from extremely dilute solutions, such as are characteristic of fermented beers, by acidifying the solution to about pH 1 to 4, and we take advantage of this discovery to provide an improved process for the recovery of fumagillin from a fumagillin-containing fermented beer in which the fermented beer is acidified to pH 1 to 4 to precipitate the fumagillin. In this manner, the water-soluble contaminants, which otherwise would have been extracted from the neutral beer were the processes of the prior art used, are left therein and a crude fumagillin, from which pure fumagillin can readily be recovered by suitable extraction and crystallization processes, is easily separated from the fermented beer.

Thus we have found further that the crude fumagillin separated from the acidified fermented beer can be purified by extracting the wet crude with acetone, or like low-boiling hydrophilic solvent, such as ethanol, methanol, propanol, butanol, or ethyl acetate; separating a second crude fumagillin therefrom; extracting the wet second crude fumagillin with chloroform or like water-immiscible solvent, such as methylene chloride, methyl isobutyl ketone, or butanol; drying the solution thus obtained by means of a suitable dehydrating agent, such as anhydrous sodium sulfate, calcium chloride, magnesium sulfate, or silica gel, or other segregation process, such as by centrifuging whereby the water and the water-soluble material dissolved therein are removed; and recovering fumagillin from the anhydrous solution thus obtained.

By "low-boiling solvent" we mean that the solvent is sufficiently low boiling that it can be distilled away from its water solution. Either its boiling point or that of its azeotrope with water, if it forms such, should be below the boiling point of water.

If desired, the fumagillin thus recovered can be still further purified by recrystallizing it from methanol, or like solvent, such as ethanol, acetone, butanol, or methyl ethyl ketone, to which may be added water, especially with the miscible solvents, methanol, ethanol, and acetone, to initiate the precipitation of fumagillin therein.

In carrying out the processes of the invention, we have found it desirable first to clarify and sometimes to defat the original beer, as for example, by filtering with or without a filter aid at a pH greater than about six and less than eight to remove the mycelium introduced with the inoculum. This has the advantage that undesirable oily impurities in the mycelium are not carried into the subsequent extracts. If desired, the neutral beer (pH 6 to 8) can be extracted with Skellysolve B (a refined petroleum ether), or other hydrocarbon solvent, to defat the filtered beer. This is especially advantageous if lard oil, or an excessive amount thereof, is used as an antifoam agent in the fermentation. The thus clarified and defatted beer is then treated for the recovery of fumagillin.

The neutral beer, with or without the above clarifying and defatting treatments, though advantageously after clarification, is acidified to pH 1 to 4. The acidity desirably is adjusted to about pH 2 where the solubility of the fumagillin is at a minimum. Since the solubility of fumagillin is a function of the pH, the nature of the acid is not important except for economical reasons and for this purpose such acids as sulfuric, hydrochloric, acetic, chloro-acetic, and phosphoric acids can be used. Acidification with any of these acids to a pH between about one and about four, advantageously to pH 2, causes the fumagillin to precipitate in a fine dispersion from which the precipitated fumagillin can be recovered by filtering with a filter press or a centrifuge.

Advantageously the filtration of the precipitated fumagillin is effected in the presence of a filter aid in order to promote flocculation of the finely dispersed precipitate. Thus if the beer containing the dispersed fumagillin is treated with a finely divided diatomaceous earth or like filter aid, the finely dispersed particles of fumagillin are flocculated on the particles of the filter aid and thereby made more easily separable from the beer. The precipitation and recovery of the fumagillin content of the fermented beer is so complete under these conditions that it is neither necessary nor desirable to recover the spent beer (filtrate) for further use in the process.

The wet filter cake is now extracted with acetone. This can be done by washing the cake on the filter press or on the centrifuge, if such is used, or by repulping the filter cake in acetone and refiltering to remove the filter aid. The acetone can contain substantial amounts of water, though desirably it should not contain more than about fifty percent water. If a filter press is used, it is of advantage to use anhydrous acetone or to have it as dry as is economically possible, and for this purpose it should desirably not contain more than about five percent of water. Other water-miscible solvents can contain water in like amounts. If ethyl alcohol is used, the ordinary 95 percent solution is advantageous. If water-immiscible solvents such as butanol are used, they can contain water up to the limits of solubility of water therein.

The solution thus obtained is now concentrated by evaporating the solvent. If desired, the solution can be first partially or completely neutralized with sodium hydroxide or like soluble base to prevent development of excessive acidity in the concentrate. Advantageously the evaporation is done in vacuo to keep the temperature relatively low. Advantageously the distillation of the solvent is effected with as high a vacuum as can be obtained by a barometric condenser and preferably at less than five inches mercury pressure. If butanol, or like solvent forming an azeotrope with water, is used in place of acetone, water can be added during the distillation of the solvent until all the solvent is distilled over. When the solvent is distilled off, there will remain an aqueous slurry of fumagillin. The water for this slurry comes from the wet filter cake plus any water present in the solvent plus water which may be added during the distillation. The formation of this aqueous slurry has the advantage that water-soluble impurities are retained in solution and thus easily separated on filtering the slurry.

The semi-refined fumagillin or second crude fumagillin thus obtained is further refined by extracting it with chloroform or like water-immiscible solvent. Advantageously this is done after filtering off the water from the aqueous slurry so that the water-soluble materials are not also extracted. Thus the wet filter cake is advantageously extracted either on the filter press, or centrifuge, or by repulping it in the chloroform or like water-immiscible solvent, but if desired, the aqueous slurry can be extracted directly with the chloroform in a suitable extractor such as a Podbielniak extractor.

There is thus obtained a still further refined fumagillin in solution in chlorofrom or like water-immiscible solvent from which the fumagillin is recovered by first drying the solution to remove the water picked up from the wet filter cake or aqueous slurry, and then evaporating off the solvent. If this drying is effected by a segregation process, for example, adsorption of the water or centrifuging, a still further separation of water-insoluble impurities is effected. The refined fumagillin thus obtained can then be further purified by dissolving it in a solvent from which it can readily be crystallized and recrystallizing it from such solvent one or more times. Anhydrous methanol has been found particularly advantageous and for this purpose the addition of a small amount of water is often advantageous to initiate crystallization. Effective crystallization is obtained, for example, by taking up the fumagillin extract with boiling anhydrous methanol and cooling to about minus forty degrees centigrade with or without the addition of up to about fifty percent of water. Other solvents which can similarly be used effectively to recrystallize the refined fumagillin are ethanol, acetone, butanol, and methyl ethyl ketone. Advantageously the crystallizing solvent can be added to the chloroform extract before all of the chloroform is evaporated off. Thus methanol can be added to the chloroform solution and the chloroform then distilled off, leaving a solution from which fumagillin readily crystallizes on cooling.

The term "segregation process" refers to a process, like adsorption or centrifuging, in which the wet solution is separated into a solvent phase and a water-rich phase which in turn is removed from the solvent phase, whereby the water-soluble impurities stay in the water, in contradistinction to processes in which the water is distilled off, and in which, therefore, the water-soluble impurities stay in the solvent phase.

The invention may be now more fully understood by reference to the following examples in which the parts are by weight unless otherwise specified.

EXAMPLE 1

Sixteen hundred gallons of four day fermented beer of culture *Aspergillus fumigatus* H-3 was assayed against *S. aureus* phage (plate assay) showing activity equivalent to 95 micrograms per milliliter or a total of 580 grams of fumagillin. The beer was filtered without filter aid, and the clarified beer, assaying 345 grams of fumagillin, was defatted by extraction with 200 gallons of Skellysolve B. To the defatted beer, assaying 260 grams of fumagillin, was added 150 lbs. of Supercel (a diatomaceous filter aid) and concentrated $H_2SO_4$ to adjust the pH to 3.0. The precipitated fumagillin and Supercel were filtered off on a plate and frame press, and the press cake extracted three times with 100 percent acetone. The combined acetone extracts, 150 gallons, were adjusted to pH 6.0 with sodium hydroxide solution and concentrated in vacuo to an aqueous suspension. The vacuum here as elsewhere in the examples was obtained with a barometric condenser, for example, a steam jet aspirator and condenser, operating to pull a vacuum of less than five inches mercury absolute pressure. The aqueous suspension was extracted three times batchwise with chloroform. The chloroform extracts, six gallons, contained by bioassay, 253 grams of fumagillin. The chloroform solution was concentrated in vacuo to a semi-solid residue, which was dissolved in methanol. The methanol solution, four liters, was chilled and held at about minus forty degrees centigrade overnight and a first crop of 90 grams of crude crystals was collected. A second crop of 69.5 grams and a third crop of 12.1 grams were obtained on concentration of mother liquors. Recrystallization of the crude crystals by dissolving in hot methanol, filtering, and chilling, resulted in a final product of 101.6 grams of white crystals.

The fermented beer used in this example is prepared in the following manner.

A. *Preparation of seed cultures of* aspergillus fumigatus H-3

A vegetative growth and spores of *A. fumigatus* H-3 grown on agar slants, is transferred to several 500 milliliter flasks, each containing 100 milliliters of the following medium.

| | Grams |
|---|---|
| Dextrin | 10 |
| Sodium chloride | 5 |
| Corn steep solids | 32 |
| Calcium carbonate | 1 |

Tap water, q.s. to make 1 liter.

The medium is adjusted to pH 6.7 by the addition of sodium hydroxide solution, sterilized, and inoculated from agar slants. It is shaken (aerated, submerged culture) for 48 hours at a temperature of 24 degrees centigrade. This culture of *A. fumigatus* H-3 can be used directly for the inoculation of fumagillin producing tanks (C) or for the production of a larger volume of inoculum (B).

B. *Preparation of inoculum*

To six liters of a medium containing the ingredients listed in A in a five-gallon flask, equipped for agitation and aeration, is added five percent by volume of a seed culture obtained as described in A. The inoculated medium is incubated at a temperature of 24 degrees centigrade, with aeration for a period of 48 hours. At the end of this time, this culture is suitable for use to inoculate large tanks.

C. *Preparation of the fermented beer*

Sixteen hundred gallons of the dextrin-steep medium described in A, contained in a two thousand gallon glass-lined fermentation tank, is inoculated with 75 gallons of a 48 hour vegetative culture of *A. fumigatus* H-3 obtained as described in B. The inoculated medium is incubated for 42 hours at a temperature of 24 degrees with aeration at a rate of about 80 cubic feet per minute with stirring.

EXAMPLE 2

Sixteen hundred gallons of fermented beer prepared as above but assaying 3040 grams of fumagillin, was filtered without filter aid. The clear beer was adjusted to pH 2.0 with $H_2SO_4$ in the presence of 100 lbs. of Supercel filter aid. The precipitated activity was filtered off on a plate and frame press, and the cake extracted on the press by recycling 100 percent acetone for three extracts. The pooled acetone extracts, 145 gallons, were concentrated in vacuo to an aqueous suspension. The suspended fumagillin was filtered off with a small amount of filter aid and the filter cake was then stirred with chloroform to extract the activity. The chloroform extract was dried by contact with anhydrous sodium sulfate and concentrated in vacuo, replacing the chloroform with methanol occasionally to arrive at a final solution of approximately 15 liters which on chilling as in Example 1, yielded 550 grams of crude crystalline fumagillin. The crude crystals were dissolved in 20 liters of warm methanol, and the solution filtered and chilled. White crystals formed, were filtered off and dried under vacuum. There was thus obtained 472 grams of crystals melting at 193 degrees centigrade, and having a purity by ultra violet determination of 99.6 percent.

While we have thus described and illustrated our invention with reference to particular embodiments, it will be understood that the invention is not limited thereto and that the invention can be variously embodied within the spirit and scope of the invention as set forth above and in the appended claims.

We claim:

1. In a process for the recovery of fumagillin from fermented beer containing the same, the improvement which comprises precipitating fumagillin by acidifying the fermented beer to a pH between about one and about four, and filtering off the precipitate.

2. The process of claim 1 in which the mycelium of the ferment is removed prior to the precipitation of the fumagillin.

3. In a process for the recovery of fumagillin from fermented beer containing the same, the improvement which comprises clarifying the beer, acidifying the fermented beer to a pH between about one and about four, adding a filter aid, filtering off a crude fumagillin, and extracting fumagillin from the filter cake thus obtained.

4. The process of claim 3 in which the extraction comprises first extracting the wet filter cake fumagillin with a hydrophilic solvent for fumagillin, separating a crude fumagillin therefrom, extracting the wet crude fumagillin with a water-immiscible solvent for fumagillin, drying the solution thus obtained, and recovering fumagillin from the dried solution thus obtained.

5. The process of claim 3 in which the extraction comprises first extracting the wet crude fumagillin with a hydrophilic solvent for fumagillin, separating a second crude fumagillin therefrom, extracting the wet said second crude fumagillin with a water-immiscible inert solvent for fumagillin, separating the wet solution thus obtained into a solvent phase and a water-rich phase and removing the water-rich phase, and recovering fumagillin from the dried solution thus obtained.

6. The process for the recovery of fumagillin from fermented beer containing the same, which comprises acidifying said beer to a pH of about 1 to 4, adding a filter aid thereto, and filtering; extracting the filter cake with a hydrophilic solvent for fumagillin, evaporating said solvent and thereby leaving an aqueous slurry of crude fumagillin, and filtering said slurry; and extracting the filter cake thus obtained with a substantially water-immiscible solvent for fumagillin, drying the extract thus obtained, and recovering fumagillin therefrom.

7. The process of claim 6 in which the hydrophilic solvent is acetone.

8. The process of claim 7 in which the water-immiscible solvent is chloroform.

9. The process for the recovery of fumagillin from fermented beer containing the same, which comprises acidifying said beer to a pH of about 1 to 4, adding a filter aid thereto, and filtering; extracting the filter cake with acetone, evaporating said acetone, and thereby leaving an aqueous slurry of crude fumagillin, and filtering said slurry; and extracting the filter cake thus obtained with chloroform, separating the chloroform solution thus obtained into a water-rich phase and a chloroform-rich phase and removing the water-rich phase therefrom and recovering fumagillin from the chloroform-rich phase.

References Cited in the file of this patent

UNITED STATES PATENTS

| | | |
|---|---|---|
| 2,516,080 | Sobin et al. | July 18, 1950 |
| 2,521,770 | Babson et al. | Sept. 12, 1950 |
| 2,652,356 | Hanson et al. | Sept. 15, 1953 |

OTHER REFERENCES

Reilly et al.: Art. in Cancer Res., May 1951, pp. 366–369, vol. 11, No. 5.

Asheshov et al.: Canadian J. of Public Health, vol. 39, p. 75, February 1948.

Asheshov et al.: (1), Br. J. of Exptl. Pathology, vol. 30, 1949, pp. 175–185.

Asheshov et al.: (2), "Antibiotics and Chemotherapy," vol. 2, No. 7, pp. 361 and 362, July 1952.

Schenck et al.: J. Am. Chem. Soc., May 5, 1953, p. 2274.

Garrett et al.: J. Am. Pharm. Assoc., Sci. Ed., July 1954, pp. 385–390.